United States Patent
Gwak

(10) Patent No.: US 8,659,674 B2
(45) Date of Patent: Feb. 25, 2014

(54) DIGITAL PHOTOGRAPHING APPARATUS AND METHOD FOR CONTROLLING THE SAME DURING MANUAL OPERATION

(75) Inventor: Jin-pyo Gwak, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 12/291,418

(22) Filed: Nov. 10, 2008

(65) Prior Publication Data

US 2009/0174790 A1    Jul. 9, 2009

(30) Foreign Application Priority Data

Jan. 8, 2008 (KR) .................. 10-2008-0002315

(51) Int. Cl.
*H04N 9/73* (2006.01)
(52) U.S. Cl.
USPC ...................................... 348/223.1
(58) Field of Classification Search
USPC ........................ 348/208.15, 223.1
See application file for complete search history.

(56) References Cited

U.S. PATENT DOCUMENTS

2003/0146984 A1* 8/2003 Sakaguchi et al. ......... 348/223.1
2006/0038894 A1* 2/2006 Chan et al. ................. 348/222.1

OTHER PUBLICATIONS

Office Action established for CN 200810187117.X (Mar. 31, 2012).
Office Action established for CN 200810187117.X (Jun. 18, 2013).

* cited by examiner

*Primary Examiner* — James Hannett
(74) *Attorney, Agent, or Firm* — Drinker Biddle & Reath LLP

(57) ABSTRACT

A digital photographing apparatus which, when operating in a manual mode for externally manipulating and setting photographing variables, determines when a photo is to be taken, and if photographing conditions are changed from those which occurred when photographing variables were set, notifies a user of the change so that a photo can be taken with desired photographic variables. A method of controlling a digital photographing apparatus to perform these operations is also provided.

19 Claims, 8 Drawing Sheets

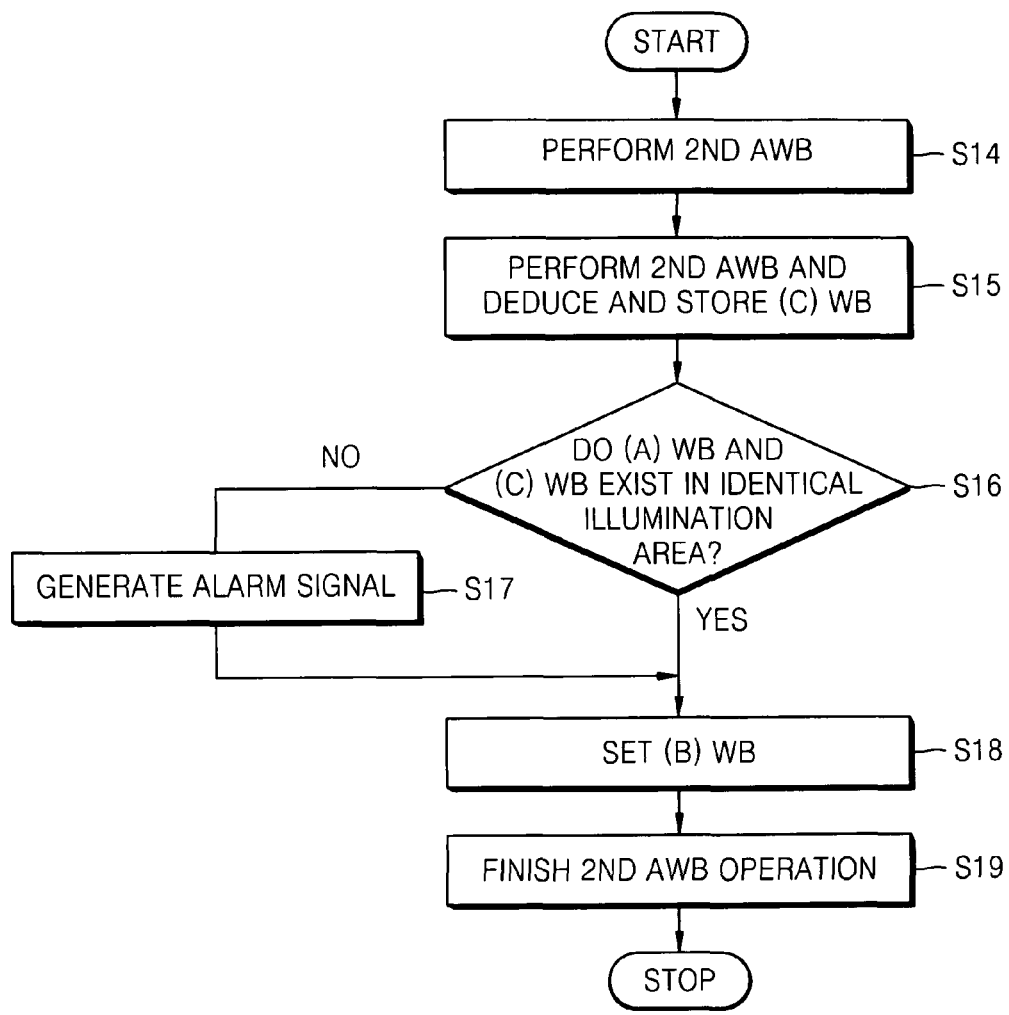

DIGITAL PHOTOGRAPHING APPARATUS AND METHOD FOR CONTROLLING THE SAME DURING MANUAL OPERATION

CROSS-REFERENCE TO RELATED PATENT APPLICATIONS

This application claims the benefit of Korean Patent Application No. 10-2008-0002315, filed on Jan. 8, 2008, in the Korean Intellectual Property Office, the entire content of which is incorporated herein by reference.

BACKGROUND OF THE INVENTION

1. Field of the Invention

The present invention relates to a digital photographing apparatus performing a manual mode in which photographing variables are manipulated and set externally, and a method of controlling the digital photographing apparatus to perform these operations.

2. Description of the Related Art

When a photo is taken and an image is generated accordingly, photographing variables have much influence on the picture quality of the image. For example, according to the type of illumination, for example, whether a photo is taken under the sun or under a fluorescent light, the environment of the image may vary greatly. Hence, in order to obtain a desired image, a function for adjusting white balance is included in a digital photographing apparatus. The adjustment of white balance can be regarded as an operation to be performed in order to make the digital photographing apparatus remember colors felt and received on the spot through light so that colors reflected from an object can be accurately expressed.

Accordingly, there are a variety of photographing variables adjusting conditions for photographing, and when these photographing variables are set as desired, a desired image can be obtained. That is, an image accurately taken from an object as if it is seen by human eyes can be obtained.

In particular, in order to arbitrarily obtain images of a variety of environments in addition to obtaining an accurately photographed image of an object, experts use a manual mode in which the photographing variables are personally input and set. However, when a photo is taken in the manual mode with photographing conditions changed from those which occurred when photographing variables were set, the user is more likely to forget the settings when a large amount of time has passed between the time when the photographing variables were set and the time when the photo is being taken. Also, the user usually confirms only an image displayed on a liquid crystal display (LCD) window during a preview mode without confirming the settings, and then takes a photo. Since the delicate difference with respect to the type of illumination can hardly be confirmed only with the image displayed on the LCD window, the user obtains an unwanted image.

Although simple icons on the LCD window indicate currently set illumination conditions, it may be difficult for the user to understand the indicated meaning because it is expressed on a tiny part on the side of the LCD window and indicated by icons.

SUMMARY OF THE INVENTION

The present invention provides a digital photographing apparatus which, when operating in a manual mode for a user to personally set photographing variables, determines whether or not when a photo is to be taken, determines whether photographing conditions have changed from those that existed when photographing variables were set, and notifies the user of any such changes so that a desired photo can be taken. The present invention further provides a method of controlling the digital photographing apparatus to perform these operations.

Accordingly, an embodiment of the present invention provides a method of controlling a digital photographing apparatus. The method includes: receiving a signal for setting a photographing variable, deducing a first automatic value for the photographing variable at a first time point when the setting signal is received, deducing a second automatic value for the photographing variable at a second time point after the first time point, determining whether or not the first automatic value and the second automatic value belong to an identical or substantially identical range, and if the two values do not belong to an identical or substantially identical range, generating an alarm signal.

In this case, the photographing variables include elements that can have influence on the picture quality and environment of an image when the image is generated by photographing an object. Examples are white balance, the brightness of an object (degree of exposure), and focus.

The photographing variable may be a white balance value. In this case, the white balance value may be a color temperature. The automatic value may be a white balance value deduced by performing an auto white balance (AWB) operation.

In the setting of the photographing variable, an illumination condition of an external environment may be set. The illumination condition may be expressed by a specific numerical value, or by the type of illumination, such as a glow lamp, a fluorescent lamp, and sunlight.

In determining whether or not the first and second automatic values belong to an identical or substantially identical range, it may be determined whether or not the first white balance value and the second white balance value belong to an identical or substantially identical illumination area. If the two values belong to an identical or substantially identical range, the setting for the photographing variable may be maintained. Also, the photographing variable may be the brightness of an object according to external illuminance or illumination direction. The automatic value may be the brightness of the object deduced by performing an automatic exposure (AE) algorithm.

Furthermore, in the setting of the predetermined photographing variable a flash may be set. Also, in determining whether or not the first automatic value and the second automatic value belong to the range, it may be determined whether or not a first brightness of the object and a second brightness of the object belong to an identical or substantially identical brightness range.

The method may further include maintaining the setting of the flash if it is determined that the first brightness of the object and the second brightness of the object belong to the range. More specifically, a flash can be set to operate when a photo is taken, and the brightness of an object which occurs when the flash is set is compared with the brightness of the object after that time. If the two values belong to an identical or substantially identical brightness range, the setting for the flash is maintained, or else, an alarm signal can be generated. The alarm signal can be implemented in a variety of forms including an alarm sound and an icon.

According embodiment of the present invention provides a digital photographing apparatus including a manipulation unit for receiving a signal for setting a photographing variable, and a performing unit for deducing a first automatic value for the photographing variable at a first time point when the setting signal is received, and deducing a second automatic value for the photographing variable at a second time point after the first time point. The apparatus further includes a comparison unit for determining whether or not the first automatic value and the second automatic value belong to an identical or substantially identical range, and a control unit which generates and alarm signal if the two values do not belong to an identical or substantially identical.

The photographing variable may be a white balance value, and the performing unit may include an AWB performing unit deducing an AWB value by performing AWB. The comparison unit may determine whether or not the first and second automatic values belong to an identical or substantially identical range. The manipulation unit may receive a signal for setting an illumination condition of an external environment.

Also, the control unit may comprise a WB control unit which, if the two values do not belong to an identical or substantially identical range, generates an alarm signal and if the two values belong to an identical or substantially identical range, maintains the setting of the illumination condition of the external environment.

The photographing variable may be the brightness of an object, and the performing unit may include an automatic exposure (AE) performing unit deducing the brightness of an object by performing an AE algorithm. The comparison unit may determine whether or not the first automatic value and the second automatic value belong to an identical or substantially identical brightness range of the object. The manipulation unit may receive a flash setting signal.

Furthermore, the control unit may include a brightness control unit which, if the first automatic value and the second automatic value do not belong to the range, generates an alarm signal, and if the first automatic value and the second automatic value belong to the range, maintains the flash setting.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are flowcharts explaining an example of a method of controlling a digital photographing apparatus according to an embodiment of the present invention;

DETAILED DESCRIPTION OF THE EMBODIMENTS

Exemplary embodiment of the present invention will now be described more fully with reference to the accompanying drawings.

Figure 1:
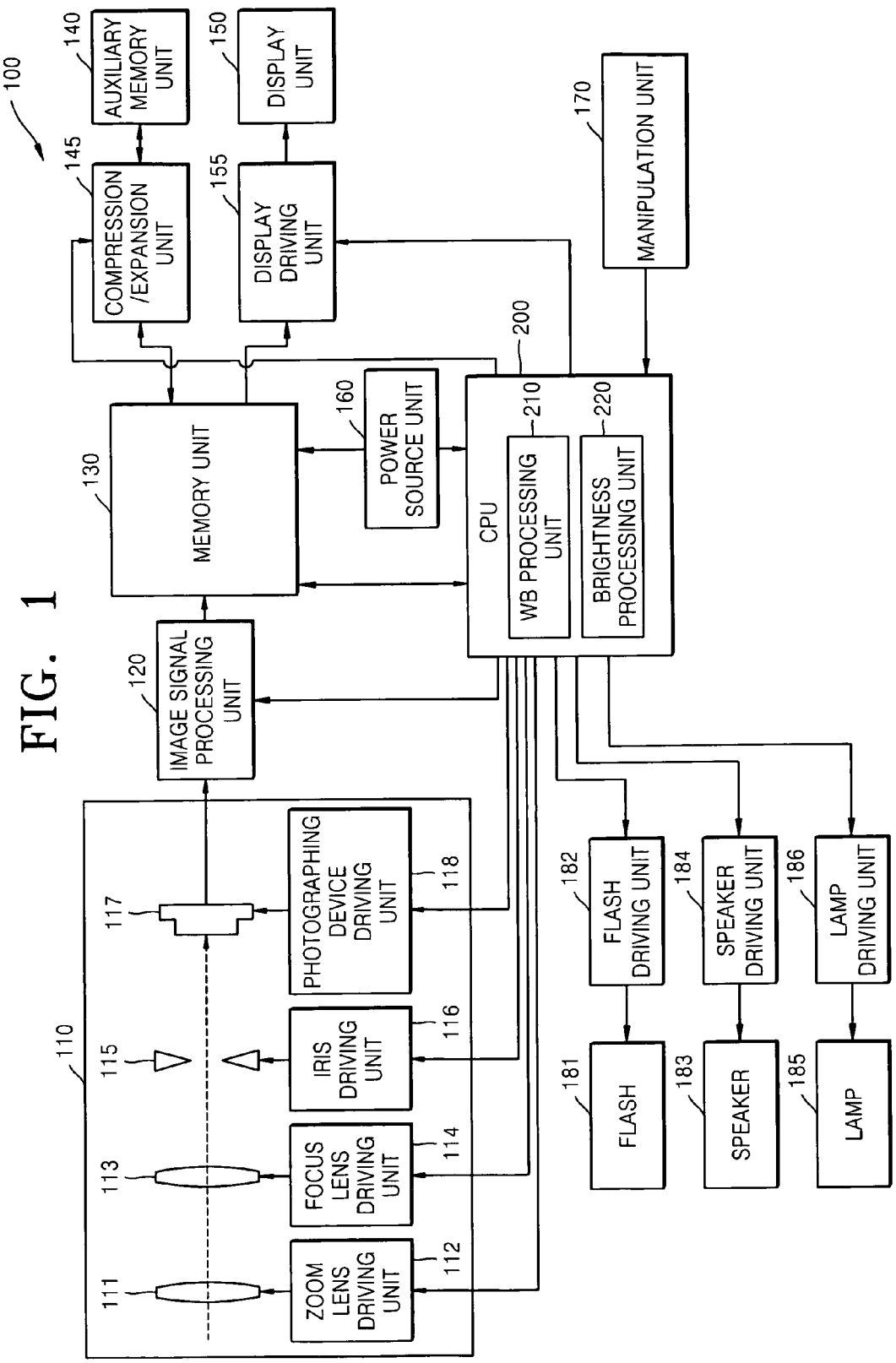
FIG. 1 is a block diagram illustrating an example of a digital photographing apparatus according to an embodiment of the present invention.

FIG. 1 is a block diagram illustrating an example of a digital photographing apparatus 100 according to an embodiment of the present invention. In the current embodiment, the structure of the digital photographing apparatus illustrated in FIG. 1 will now be explained in detail with respect to operations.

In relation to a process of photographing an object, the light from an object is traveling through a zoom lens 111 and a focus lens 113 that are part of an optical system of a photographing unit 110, and the amount of the light is adjusted according to the degree of opening of the iris 115. Then, when the light is incident on the light-reception surface of a photographing device 117, an image of the object is formed. The image formed on the light-reception surface of the photographing apparatus 117 is converted into an electric image signal in a photoelectric conversion process.

As the photographing device 117, a charge coupled device (CCD) or a complementary metal oxide semiconductor image sensor (CIS) which converts an optical signal into an electric signal can be used. In an ordinary state or when an autofocusing algorithm is executed by receiving a first release signal formed by about half pressing a release button, the iris 115 is opened, and by receiving a second release signal formed by gently pressing the release button, exposure processing can be performed.

The positions of the zoom lens 111 and the focus lens 113 are controlled by a zoom lens driving unit 112 and a focus lens driving unit 113, respectively. For example, if a wide angle-zoom signal is generated, the focal length of the zoom lens 111 is shortened, thereby widening the angle of view. If a telephoto-zoom signal is generated, the focal length of the zoom lens 111 is lengthened, thereby narrowing the angle of view. In a state where the position of the zoom lens 111 is set, the position of the focus lens 113 is adjusted by the focus lens driving unit 114, and therefore the angle of view is hardly affected by the position of the focus lens 113. The degree of opening of the iris 115 is controlled by an iris driving unit 116. The sensitivity of the photographing device 117 is controlled by a photographing device control unit 118. The zoom lens driving unit 112, the focus lens driving unit 114, the iris driving unit 116, and the photographing device control unit 118 control corresponding units according to results calculated in a CPU 200 based on exposure information, focus information, and the like.

In relation to a process of forming an image signal, an image signal output from the photographing device 121 is transferred to an image signal processing unit 120. In the image signal processing unit 120, if the image signal input from the photographing device 117 is an analog signal, the signal is converted into a digital signal, and a variety of image processing processes for the converted digital image signal are performed. The image signal obtained after these processes is temporarily stored in a memory unit 130.

More specifically, the image signal processing unit 120 improves the picture quality of the image data by performing signal processing processes, such as auto white balance, auto exposure, and gamma correction, in order to convert the image data to fit human vision. Also in the signal processing unit 120, image processing processes such as color filter array interpolation, color matrix, color correction, and color enhancement, are performed.

The memory unit 130 may include a program memory unit storing programs for operations of the digital photographing apparatus 100 whether or not power is supplied, and a main memory unit temporarily storing the image data and other data only while power is supplied. In the program memory unit, operation programs for operating the digital photographing apparatus 100 and a variety of application programs are stored. According to the programs stored in the program memory unit, the CPU 200 controls each unit.

The main memory unit in this example temporarily stores an image signal output from the image signal processing unit 120 or an auxiliary memory unit 140. The main memory unit can be directly connected to a power source unit 160 separately from supplying of power for the digital photographing apparatus 100 to operate. Accordingly, in order to quickly boot up the digital photographing apparatus 100, a code stored in the program memory unit can be copied into the main memory unit and converted into an executable code in advance. Also, when the digital photographing apparatus 100 is rebooted up, the data stored in the main memory unit can be quickly read.

The image signal stored in the main memory unit of memory unit 130 is output to a display driving unit 155 and converted into an analog signal in an optimal form to be output and displayed. The converted image signal is displayed on a display unit 150, thereby allowing the user to see it as a predetermined image. In a photographing mode proceeding, the display unit 150 continuously displays an image signal obtained by the photographing device 117, thereby also playing a role of a viewfinder to determine a photographing scope. As this display unit 150, a variety of display apparatuses such as an LCD, an organic light-emitting display (OLED), and an electrophoretic display, can be used.

In relation to a process of recording the thus generated image signal, the image signal is temporarily stored in the main memory unit of memory unit 130, and in this case, in addition to the image signal, a variety of information items are stored together in the auxiliary memory unit 140. Then, the stored image signal and information items are output to a compression/expansion unit 145. In the compression/expansion unit 145, compression processing, i.e., encoding processing such as joint photographic experts group (JPEG), is performed in an optimal form by a compression circuit, thereby forming an image file, and the image file is stored in the auxiliary memory unit 140.

As the auxiliary memory unit 140, a variety of forms of storage media, including a magnetic storage medium such as a hard disc or a floppy disc, as well as semiconductor memories including a fixed-type semiconductor memory such as an external flash memory or a card-type flash memory having a card or stick shape and freely detachable to an apparatus, can be used.

In relation to a process of reproducing an image, the image file compressed and recorded in the auxiliary memory unit 140 is output to the compression/expansion unit 145, and expansion processing, for example, decoding processing, is performed by an expansion circuit, thereby extracting an image signal from the image file. The image signal is temporarily stored in the memory unit 130, and then, can be reproduced as a predetermined image in the display unit 150 through the display driving unit 155.

In addition, the digital photographing apparatus 100 includes a manipulation unit 170. The manipulation unit 170 includes, for example, a shutter-release button which is opened and closed in order to expose the photographing device 121 to light for a predetermined time, a power source button for an input to supply power, a wide angle-zoom button and a telephoto-zoom button for widening or narrowing the angle of view according to an input, and a variety of function buttons for selecting a mode, such as a character input or photographing mode or a reproduction mode, or for selecting a white balance setting function, and an exposure setting function.

Also, a flash 181 and a flash driving unit 182 for driving the flash 181 are included. The flash 181 is a light-emitting apparatus for making an object bright by momentarily throwing bright light on the object when a photo is taken in a dark place.

A speaker 183 and a lamp 185 can perform a function for notifying an operation state and the like of the digital photographing apparatus 100, by outputting a voice signal and a light signal, respectively. In particular, in this embodiment, when a photo is to be taken in a manual mode, if photographing conditions are changed from those which occurred when photographing variables were set, an alarm signal to notify this change can be implemented as an alarm sound through the speaker 183 or an optical signal through the lamp 185. The type, magnitude, and the like of voice of the speaker 183 can be controlled by the speaker driving unit 184. Whether or not to emit light, the light-emitting time, and the type of light of the lamp 185 can be controlled by the lamp driving unit 186.

The CPU 200 processes operations according to the operating system and application programs stored in the memory unit 130, temporarily stores the operation results, and according to the operation result, the CPU 200 controls corresponding units, thereby operating the digital photographing apparatus 100 as described above. In particular, in this embodiment, the CPU 200 may include a WB processing unit 210. In a manual mode in which white balance is personally input and adjusted by the user, if it is determined that a white balance value automatically obtained when the value was set and a white balance value automatically obtained when a photo is actually to be taken do not belong to an identical or substantially identical illumination region, the WB processing unit 210 notifies this to the user. The WB processing unit 210 and a controlling method using the WB processing unit 210 will be explained later with reference to FIGS. 2 through 4.

Also, in the digital photographing apparatus 100 according to the present invention the CPU 200 may include a brightness control unit 220. In a manual mode in which the brightness of an object is set by the user, if it is determined that the brightness of the object which was deduced when the brightness was set and the brightness of the object occurring when a photo is desired to be taken do not belong to an identical or substantially identical photographing condition range, the brightness control unit 220 notifies this to the user. The brightness control unit 220 will be explained later in more detail with reference to FIGS. 5 and 6. The WB processing unit 210 of the digital photographing apparatus 100 illustrated in FIG. 1 will now be explained with reference to FIGS. 2 through 4.

Figure 2:
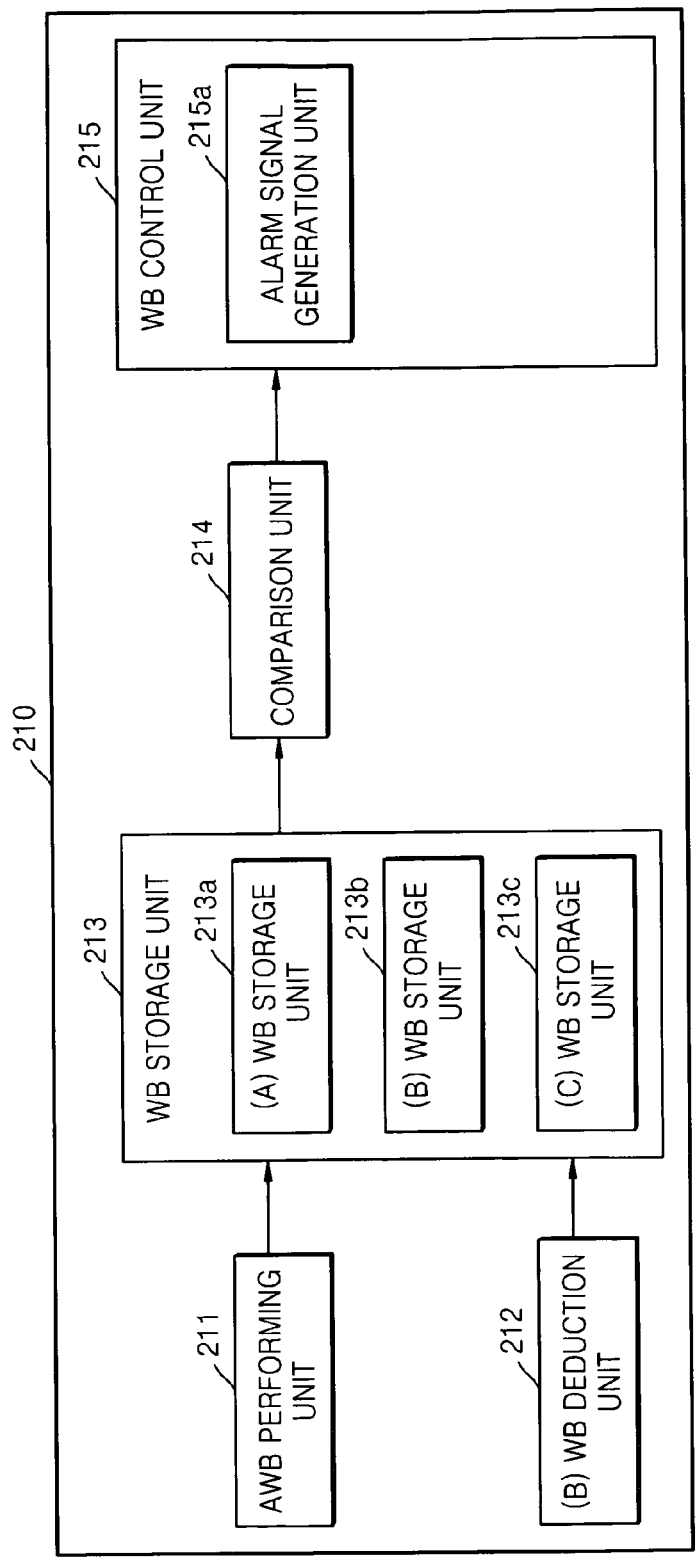
FIG. 2 is a block diagram illustrating an example of a WB processing unit of the digital photographing apparatus illustrated in FIG. 1 according to an embodiment of the present invention.
Figure 4:
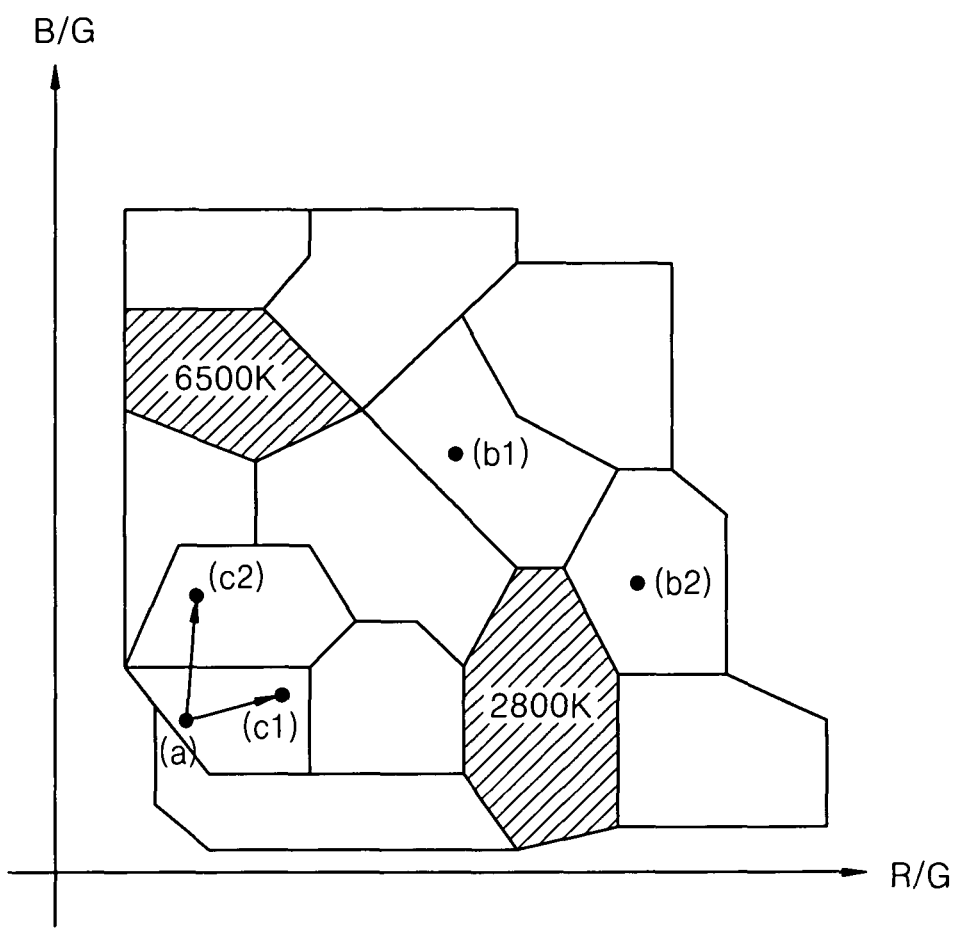
FIG. 4 is a graph explaining an example of an operation for determining whether or not (A) WB and (C) WB belong to an identical or substantially identical illumination range in the method of controlling a digital photographing apparatus illustrated in FIG. 3 according to an embodiment of the present invention.

First, referring to FIG. 2 which is a block diagram illustrating the WB processing unit 210, the WB processing unit 210 includes an automatic white balance (AWB) performing unit 211 automatically deducing a white balance value. The deduction of an AWB value is performed by using an R/G gain value and a B/G gain value. More specifically, the R/G gain value is calculated by deducing the ratio of the luminance of the red component of an image formed on the photographing device 117 to the luminance of the green component, and the B/G gain value is calculated by deducing the ratio of the luminance of the blue component to the luminance of the green component. Also, by using the graph as illustrated in FIG. 4, the color temperature value of an area corresponding to each of the R/G gain value and the B/G gain value can be deduced.

In an automatic mode in which white balance is automatically adjusted, white balance is adjusted according to the white balance value deduced from the AWB performing unit 211. However, in this embodiment, the user can personally input a white balance value through the manipulation unit 170. Also, even in the manual mode in which a white balance value is personally input, the AWB performing unit 211 for automatically deducing a white balance value operates.

The AWB performing unit 211 automatically deduces a white balance value when the user adjusts and sets white balance, and even after that, the AWB performing unit 211 automatically deduces a white balance value in real-time. For convenience of explanation, a white balance value will be expressed as WB herein. In this case, the WB can be expressed as a color temperature.

Also, the WB processing unit 210 includes a (B) WB deduction unit 212 for deducing a (B) WB corresponding to a user-set signal. The user can set the (B) WB through the manipulation unit 170.

Thus, deduced (A) WB, (B) WB, and (C) WB are stored in a WB storage unit 213. More specifically, the (A) WB, the (B) WB, and the (C) WB are output to and stored in an (A) WB storage unit 213A, a (B) WB storage unit 213B, and a (C) WB storage unit 213C, respectively. Also, the WB processing unit 210 includes a comparison unit 214 which determines whether or not the stored (A) WB and (B) WB belong to an identical or substantially identical illumination area, for example, an identical or substantially identical color temperature range.

If it is determined according to the result of the determination in the comparison unit 214 that the (A) WB and the (B) WB do not belong to an identical or substantially identical illumination area, a control signal for this is output to the WB control unit 215. The WB control unit 215 includes an alarm signal generation unit 215A which according to the control signal, generates an alarm signal notifying the user that the illumination condition occurring when a photo is desired to be taken is changed from the illumination condition which occurred when the white balance value was set. This alarm signal can be expressed as an alarm sound or an icon. If it is determined according to the result of the determination in the comparison unit 214 that the (A) WB and the (B) WB belong to an identical or substantially identical illumination area, the WB control unit 215 maintains the (B) WB set by the user.

An example of a method of controlling a digital photographing apparatus according to an embodiment of the present invention in which white balance is adjusted in a manual mode, will now be further explained with reference to flowcharts illustrated in FIGS. 3A and 3B. In this embodiment, an operation in which the user sets a WB in a manual mode will be explained with reference to FIG. 3A, and an operation in which AWB for sensing a change in a WB in the manual mode will be explained with reference to FIG. 3B.

Figure 3A:
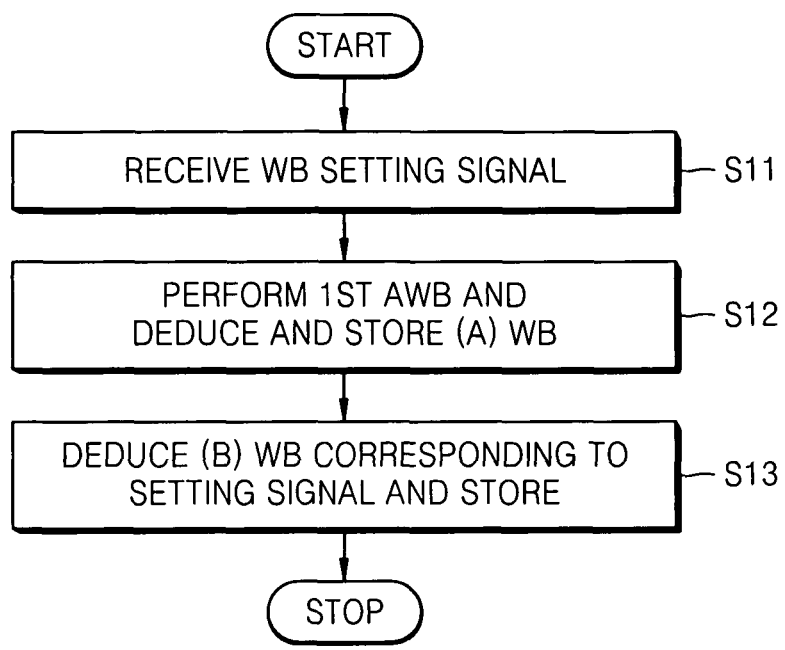

First, referring to FIG. 3A, a signal for setting a WB input from the user is received in operation S11. In a manual mode in which the user personally adjusts white balance, a first AWB operation is performed when the WB setting signal is received, and an (A) WB is deduced and stored in operation S12. Also, a (B) WB corresponding to the WB setting signal is deduced and stored in operation S13.

According to FIG. 3B, even in the manual mode as described above, an AWB operation is performed in real-time or substantially real-time. In order to distinguish this AWB operation from the first AWB operation performed when the WB setting signal is received, this AWB operation will be referred to as a second AWB.

More specifically, referring to FIG. 3B, the digital photographing apparatus performs the second AWB before a photo is taken in operation S14. By performing the second AWB, a (C) WB is deduced and stored in operation S15. Then, it is determined whether or not the (A) WB which was deduced and stored in synchronization with the WB setting signal and the (C) WB belong to an identical or substantially identical illumination area in operation S16. The second AWB is performed in real-time, thereby deducing and storing the (C) WB, and also determining in real-time whether or not the deduced (C) WB and the already stored (A) WB belong to an identical or substantially identical illumination area.

For example, referring to the graph illustrated in FIG. 4, the set (B) WB is expressed in (B1) or (B2), and a first automatic value deduced by performing the first AWB is expressed in (A) displayed in an illumination area on the bottom left. Then, when a second automatic value deduced by performing the second AWB is expressed in (C1), the (C1) WB and the (A) WB belong to an identical or substantially identical illumination area. Also, when the second automatic value deduced by performing the second AWB is (C2), (C2) and the (A) WB do not belong to an identical or substantially identical illumination area. In this case, an identical or substantially identical illumination area means an area having an identical or substantially identical color temperature value.

Accordingly, when the (A) WB and the (C) WB do not belong to an identical or substantially identical illumination area, an alarm signal notifying that the illumination condition which occurred when the user set a white balance value is changed to the illumination condition occurring when a photo is desired to be taken after that time is generated in operation S17. The alarm signal is generated and the (B) WB already set by the user is set in operation S17. According to the alarm signal, the user may reset the white balance.

Also, when the (A) WB and the (B) WB belong to an identical or substantially identical illumination area, the (B) WB input by the user is set in operation S18. If the WB is thus set, the second AWB operation is finished in operation S19.

A digital photographing apparatus which, by using the brightness of an object as a photographing variable, determines and controls a photographing condition change between a time when the photographing variable was set and a time when a photo is desired to be taken, will now be explained with reference to FIGS. 5, 6A and 6B.

Figure 5:
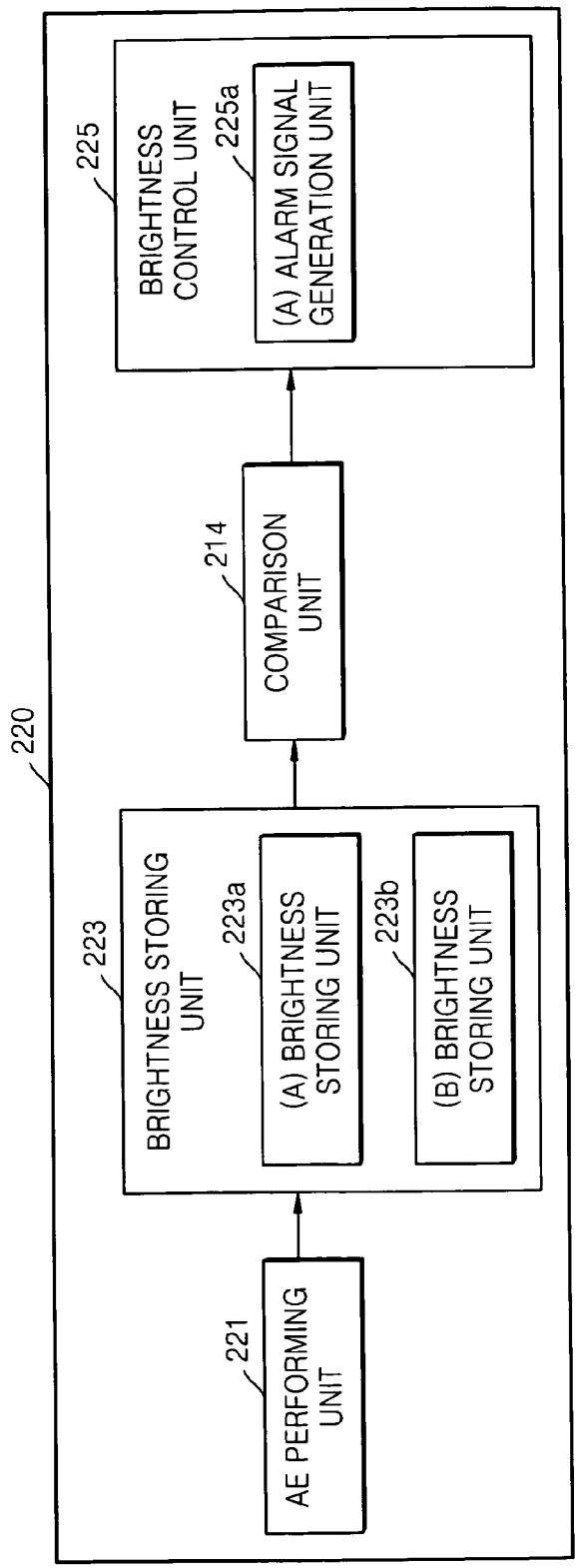
FIG. 5 is a block diagram illustrating an example of a brightness processing unit of the digital photographing apparatus illustrated in FIG. 1 according to an embodiment of the present invention.

FIG. 5 is a block diagram illustrating an example of the brightness processing unit 220 of the digital photographing apparatus 100 illustrated in FIG. 1 according to an embodiment of the present invention. Like the WB processing unit 210, if the brightness of an object which occurred when the user set a brightness in a manual mode for the user to arbitrarily manipulate a brightness, is changed to a brightness occurring when a photo is desired to be taken, the brightness processing unit 220 performs an operation to notify the user of the change.

For this, the brightness processing unit includes an automatic exposure (AE) performing unit 221. The AE performing unit 221 calculates the luminance of an image signal photographing an object in real-time while the object is recognized before an image of the object desired to be recorded and reproduced is generated by inputting a release signal, and the second release signal in particular.

More specifically, in this embodiment, the AE performing unit 221 deduces an (A) brightness of an object from an image signal occurring when the user sets a flash, and deduces a (B)

brightness of the object when a photo is desired to be taken after that time. In this case, both the time when the flash was set and the time when a photo is desired to be taken belong to a time before a photographing time when an image of the object desired to be recorded and reproduced is generated, that is, a preview mode period. For the setting of the flash, a user-set signal can be received through the manipulation unit 170.

The deduced (A) brightness and (B) brightness are stored in the brightness storage unit 223. The (A) brightness and the (B) brightness may be stored in an (A) brightness storage unit 223A and a (B) brightness storage unit 223B, respectively.

Then, the (A) brightness and the (B) brightness are output to the comparison unit 214, and the comparison unit 214 determines whether or not the brightness values belong to an identical or substantially identical range. In this case, the determination may be performed by determining whether or not the brightness values of the object belong to an identical or substantially identical brightness range.

If it is determined that the brightness values do not belong to an identical or substantially identical range, a control signal according to the determination is output to a brightness control unit 225. According to the control signal, an alarm signal generation unit 225A of the brightness control unit 225 generates an alarm signal. The alarm signal is a signal notifying that the (A) brightness of the object measured when the flash was set and the (B) brightness of the object measured when a photo is desired to be taken do not belong to an identical or substantially identical range. Also, if it is determined that the brightness values belong to an identical or substantially identical range, a control signal according to the determination is output to the brightness control unit 225, and the brightness control unit 225 sets the flash according to the flash setting signal input by the user.

Figure 6A:
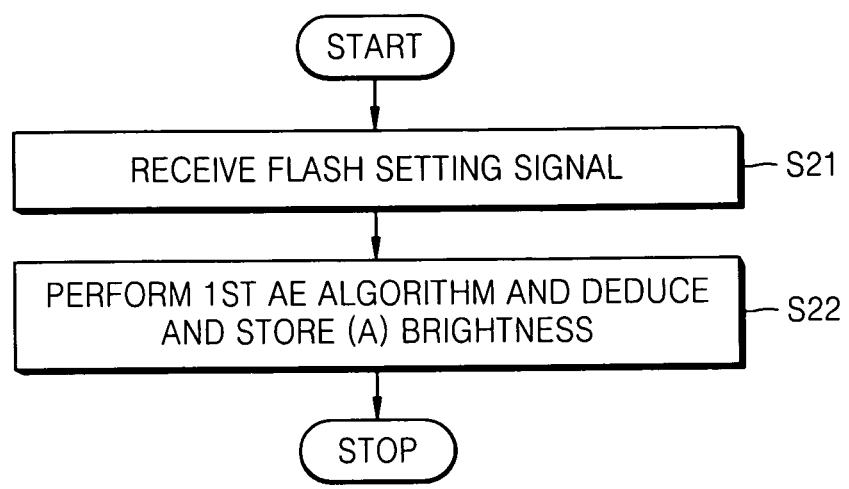
FIGS. 6A and 6B are flowcharts illustrating an example of a method of controlling a digital photographing apparatus according to another embodiment of the present invention.
Figure 6B:
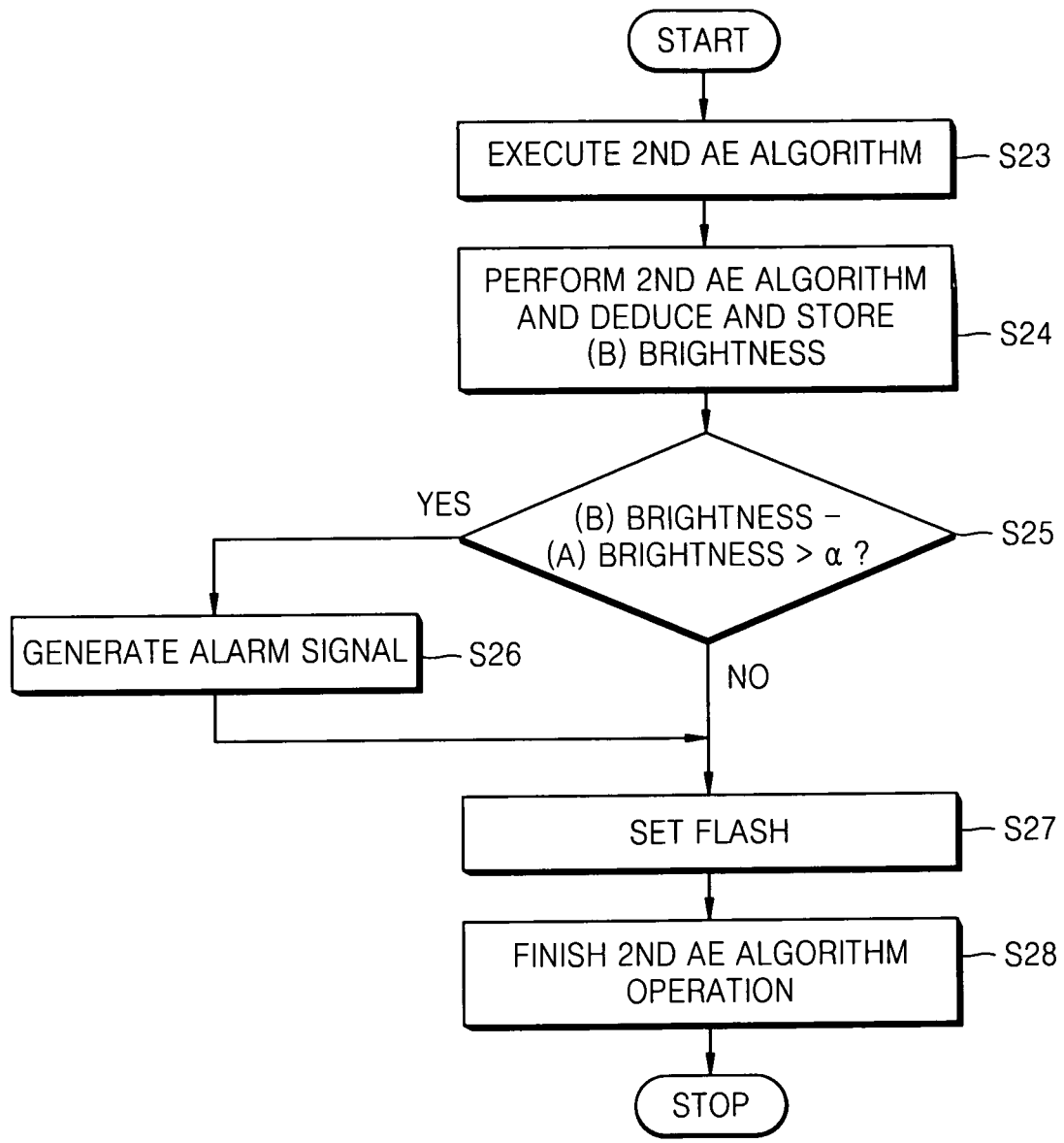

FIGS. 6A and 6B are flowcharts illustrating an example of a method of controlling a digital photographing apparatus which compares the (A) brightness of an object automatically deduced when a flash was set and the (B) brightness of the object automatically deduced when a photo is desired to be taken, and if the brightness values do not belong to an identical or substantially identical brightness range, notifies the user of the photographing condition change. More specifically, FIG. 6A is a flowchart illustrating an example of a process in which the user sets the flash, and FIG. 6B is a flowchart illustrating an example of a process in which an AE algorithm is performed in real-time in a preview stage before photographing an object.

Referring to FIG. 6A, first, in a manual mode in which the user arbitrarily sets a photographing variable, a flash setting signal is received in operation S21. By performing a first AE algorithm from the image signal at the time when the photographing variable is set, thereby calculating the luminance of the object, the (A) brightness of the object is automatically deduced and stored in operation S22.

Referring to FIG. 6B, a second AE algorithm is performed in operation S23. By performing a second AE algorithm in real-time, the (B) brightness is deduced and stored in operation S24.

Then, it is determined whether or not the (A) brightness and the (B) brightness belong to an identical or substantially identical photographing variable range in operation S25. This determination can also be expressed as (B) brightness−(A) brightness>α. By performing the second AE algorithm in real-time before the photographing, the determination of whether or not the (A) brightness stored in advance and the (B) brightness deduced through the second AE algorithm belong to an identical or substantially identical photographing variable range can be performed in real-time.

If the determination result indicates that the brightness values do not belong to an identical or substantially identical photographing variable range, an alarm signal notifying that the (A) brightness of the object which occurred when the flash was set and the (B) brightness of the object which occurs when a photo is desired to be taken do not belong to an identical or substantially identical brightness range of the object is generated in operation S26. For example, when the user sets the flash to operate under a photographing condition of backlighting and then, the direction of light changes and the photographing condition is not the backlighting condition any more, the (B) brightness may be greater than the (A) brightness, and in particular, when the difference of the brightness values is greater than an allowable value a, the brightness of the object changes substantially. The alarm signal can be generated to indicate that the photographing condition which occurred when the flash was set is changed to the photographing condition which occurs when a photo is desired to be taken. According to the alarm signal, the user can adjust the brightness of the object. For example, the user can turn off the flash.

Also, if the (B) brightness and the (A) brightness belong to an identical or substantially identical photographing variable range, the flash can be set according to the flash setting signal initially input in operation S27. For example, if the (A) brightness of the object was measured under a backlighting condition when the flash was set and then, the (B) brightness of the object is measured under the same illumination condition range as the backlighting condition when a photo is desired to be taken, the flash can be set according to the setting signal.

If the exposure is adjusted by using the brightness of the object as described above, the second AE algorithm operation is finished in operation S28. Accordingly, when the photographing condition is changed in the manual mode, it can be determined by using the brightness of the object which is automatically deduced, and by controlling the condition, a desired image can be obtained.

As can be appreciated from the above, the embodiments of the present invention described herein provide a digital photographing apparatus which, when operating in a manual mode, determines whether a first automatic value obtained by automatically calculating a photographing variable when the photographing variable was set by a user, and a second automatic value obtained by automatically calculating the photographing variable when a photo is desired to be taken, belong to an identical or substantially identical photographing condition range, and if not, notifies the user so that a desired image can be obtained. The embodiments of the present invention described herein further provide a method of controlling the digital photographing apparatus to perform these operations.

In particular, the embodiment of the present invention described herein can provide a digital photographing apparatus and method which, in relation to white balance and the brightness of an object as the photographing variables, notifies the user of the change between the photographing condition which occurred when the photographing variable was set and the photographing condition which occurs when a photo is desired to be taken.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a digital photographing apparatus, the method comprising:
receiving a signal corresponding to a user-selected white balance value;
automatically deducing a first value based on light received by the photographing apparatus at a time when the signal is received;
computing a second white balance value based on the received signal;
automatically deducing a third white balance value based on light received by the photographing apparatus at a time later than when the signal is received;
comparing the first and third white balance values; and
generating an alarm signal, based on the comparison, when the first and third white balance values do not belong to a substantially identical range.

2. The method of claim 1, wherein the first and third white balance values are each deduced by performing an auto white balance (AWB) operation.

3. The method of claim 1, wherein computing the second white balance value comprises setting an illumination condition of an external environment.

4. The method of claim 1, wherein determining when the first and third white balance values belong to the substantially identical range comprises determining whether the first white balance value and the third white balance value correspond to substantially identical illumination areas.

5. The method of claim 1, further comprising, when the first and third white balance values belong to the substantially identical range, setting a white balance value of the photographing apparatus equal to the second white balance value.

6. The method of claim 1, wherein the photographing variable includes the brightness of an object.

7. The method of claim 6, wherein the first automatic value includes the brightness of the object deduced by performing an automatic exposure (AE) algorithm.

8. The method of claim 6, wherein setting the manual value of the photographing variable comprises enabling a flash.

9. The method of claim 6, wherein determining whether the first automatic value and the second automatic value belong to the substantially identical range comprises determining whether a first automatic brightness value of the object and a second automatic brightness value of the object belong to a substantially identical brightness range.

10. The method of claim 9, further comprising maintaining the setting of the flash if it is determined that the first automatic brightness value of the object and the second automatic brightness value of the object belong to the substantially identical range.

11. A digital photographing apparatus comprising:
a manipulation unit programmed to receive a signal corresponding to a user-selected white balance value;
a performing unit programmed to:
automatically deduce a first white balance value based on light received by the photographing apparatus at a time when the signal is received;
compute a second white balance value based on the received signal; and
automatically deduce a third white balance value based on light received by the photographing apparatus at a time later than when the signal is received; and
a control unit programmed to:
compare the first and third white balance values; and
generate an alarm signal, based on the comparison, when the first and third white balance values do not belong to a substantially identical range.

12. The apparatus of claim 11, wherein the performing unit comprises an automatic white balance (AWB) performing unit to automatically deduce the first and third white balance values by performing AWB.

13. The apparatus of claim 11, further comprising a comparison unit to determine when the first and third white balance values belong to a substantially identical color temperature range.

14. The apparatus of claim 11, wherein the manipulation unit is programmed to receive a signal for setting an illumination condition of an external environment.

15. The apparatus of claim 14, wherein the control unit comprises a white balance (WB) control unit that, when the first and third white balance values do not belong to the substantially identical range, generates the alarm signal, and when the first and third white balance values belong to the substantially identical range, sets a white balance value of the photographing apparatus equal to the second white balance value.

16. The apparatus of claim 11, wherein the photographing variable includes the brightness of an object, and the performing unit comprises an automatic exposure (AE) performing unit to deduce the brightness of the object by performing an AE algorithm.

17. The apparatus of claim 16, further comprising a comparison unit to determine whether the first automatic value and the second automatic value belong to a substantially identical brightness range of the object.

18. The apparatus of claim 16, wherein the manipulation unit is to receive a flash setting signal.

19. The apparatus of claim 18, wherein the control unit comprises a brightness control unit that, if the first automatic value and the second automatic value do not belong to the substantially identical range, generates the alarm signal, and if the first automatic value and the second automatic value belong to the substantially identical range, maintains the flash setting.

* * * * *

UNITED STATES PATENT AND TRADEMARK OFFICE
CERTIFICATE OF CORRECTION

| | |
|---|---|
| PATENT NO. | : 8,659,674 B2 |
| APPLICATION NO. | : 12/291418 |
| DATED | : February 25, 2014 |
| INVENTOR(S) | : Jin-pyo Gwak |

Page 1 of 1

It is certified that error appears in the above-identified patent and that said Letters Patent is hereby corrected as shown below:

IN THE CLAIMS:

In Claim 1, Column 11, line 12, replace "automatically deducing a first value" with -- automatically deducing a first white balance value --

Signed and Sealed this
Seventh Day of October, 2014

Michelle K. Lee
*Deputy Director of the United States Patent and Trademark Office*